United States Patent [19]
Odaira et al.

[11] Patent Number: 5,519,076
[45] Date of Patent: May 21, 1996

[54] HALOGEN-CONTAINING RESIN COMPOSITION

[75] Inventors: Shouji Odaira, Meiwa; Hisashi Ishii, Kuki, both of Japan

[73] Assignee: Nissan Ferro Organic Chemical Co, Ltd., Tokyo, Japan

[21] Appl. No.: 520,764

[22] Filed: Aug. 30, 1995

Related U.S. Application Data

[63] Continuation-in-part of Ser. No. 393,075, Feb. 23, 1995, abandoned.

[30] Foreign Application Priority Data

Feb. 24, 1994 [JP] Japan ......................... 6-49968
Jan. 9, 1995 [JP] Japan ......................... 7-16363

[51] Int. Cl.⁶ .................................................. C08K 11/00
[52] U.S. Cl. .......................... 524/112; 524/110; 524/111; 524/327
[58] Field of Search ..................... 252/400.4, 39, 252/40.7; 524/327, 111, 110

[56] References Cited

U.S. PATENT DOCUMENTS

| | | | |
|---|---|---|---|
| 2,394,418 | 2/1946 | Quattlebaum et al. | 524/112 |
| 3,147,232 | 12/1964 | Norman et al. | 524/400 |
| 3,544,463 | 12/1970 | Koft | 252/407 |
| 3,630,979 | 12/1971 | Pollock | 252/400.61 |
| 3,714,042 | 1/1973 | Greenough | 252/407 |
| 3,764,571 | 10/1973 | Jennings et al. | 252/400 |
| 3,933,740 | 1/1976 | Hopkins et al. | 524/112 |
| 4,661,544 | 4/1987 | Quinn | 252/400.61 |
| 5,147,917 | 9/1992 | Sagawara | 524/400 |
| 5,322,872 | 6/1994 | Quinn | 524/400 |

FOREIGN PATENT DOCUMENTS

| | | |
|---|---|---|
| 0446685 | 9/1991 | European Pat. Off. |
| 52-49019 | 12/1977 | Japan |
| 50-6465 | 2/1982 | Japan |
| 57-6465 | 2/1982 | Japan |
| 3265645 | 11/1991 | Japan |
| WO94/26686 | 11/1994 | WIPO |

OTHER PUBLICATIONS

Patent Abstracts of Japan, vol. 10, No. 252 (C–369) 1986: Abstract of Japanese Laid–Open Patent Publication No. 61–81462 (Apr. 25, 1986).

*Primary Examiner*—Veronica P. Hoke
*Attorney, Agent, or Firm*—Sherman and Shalloway

[57] ABSTRACT

A composition is provided comprising 100 weight parts of a halogen-containing resin (1), and 0.01 to 10, preferably 0.1 to 5 weight parts of a reaction product (2) of an overbased alkaline earth metal phenolate and/or carboxylate-carbonate complex with a polybasic carboxylic acid anhydride having not more than 10 carbon atoms. This halogen-containing resin composition is excellent in heat stability, initial color preventability, plate-out preventability and transparency.

7 Claims, No Drawings

HALOGEN-CONTAINING RESIN COMPOSITION

This application is a continuation-in-part application of Ser. No. 08/393,075 filed Feb. 23, 1995 now abandoned.

This invention relates to a novel halogen-containing resin composition excellent in heat stability, initial color preventability, transparency and plate-out preventability. More detailedly, this invention relates to a stabilized halogen-containing resin composition wherein the reaction product of at least one overbased complex selected from the group consisting of overbased alkaline earth metal phenolate-carbonate complexes, overbased alkaline earth metal carboxylate-carbonate complexes and overbased alkaline earth metal phenolate carboxylate-carbonate complexes with a polybasic carboxylic acid anhydride is added.

The above overbased complexes in this invention are compounds known per se, and are complexes formed, for example, by adding carbon dioxide to the reaction product of a monobasic phenol and/or a monobasic carboxylic acid with a larger than chemical equivalent amount of a basic alkaline earth metal compound to neutralize the excess basic alkaline earth metal compound.

Halogen-containing resins, particularly polyvinyl chloride resins are inherently unstable to heat, and decompose through dehalogenation reaction in the molecular chains by heating at the time of molding, increase of the surface temperature with sunlight at the time of use, etc., and result in coloring, lowering of mechanical strength, etc. Stabilizers are added to prevent these drawbacks.

However, stabilizers which so far been used contain a heavy metal such as cadmium or lead, and have a drawback of having toxicity. As stabilizers having less toxicity have so far been used combinations of organic acid zinc salts, organic acid alkaline earth metal salts, organotin compounds, organic phosphite esters, epoxy compounds, antioxidants, polyols, etc. Recently, a system comprising a β-diketone compound and an overbased phenol ate complex of an alkaline earth metal was proposed, as seen in Japanese Patent Publication No. 6465/1982, and a system comprising an organic overbased complex of an alkaline earth metal, an organic tin and sulfur-containing compound and a metallic soap is proposed in Japanese Patent Publication No. 49019/1977. Further, it is proposed in Japanese Laid Open Patent Publication No. 265645/1991 to use an overbased alkaline earth metal carboxylate-carbonate complex as a stabilizer (the carboxylate of this overbased complex is derived from a monobasic carboxylic acid, as stated above). It is further known to use a dibasic carboxylic acid as a stabilizer. However, a stabilizer containing as constituents both of a monobasic carboxylic acid and/or a monobasic phenol and a polybasic carboxylic acid has not been known.

The above known stabilizers have disadvantages that they bring about, because of their poor long-term heat stability, coloring at the time of molding and processing of the resin, do not have sufficient initial color prevention ability nor plate-out prevention ability, and further spoil the transparency of moldings, and improvement of these problems has strongly been demanded.

Thus, the object of this invention lies in providing an improved halogen-containing resin composition by finding a novel stabilizer not having disadvantages which known stabilizers have.

The present inventors had intensely studied for attaining the above objects, and as a result, they found that the reaction product of at least one overbased complex selected from the group consisting of overbased alkaline earth metal phenolate-carbonate complexes, overbased alkaline earth metal carboxylate-carbonate complexes and overbased alkaline earth metal phenolate carboxylate-carbonate complexes with a polybasic carboxylic acid anhydride having not more than 10 carbon atoms is excellent as a stabilizer for halogen-containing resins.

Thus, according to this invention is provided a composition comprises 100 weight parts of a halogen-containing resin having added thereto 0.01 to 10 weight parts of at least one of such reaction products as a stabilizer.

The overbased alkaline earth metal phenolate-carbonate complexes, overbased alkaline earth metal carboxylate-carbonate complexes and over based alkaline earth metal phenolate carboxylate-carbonate complexes used as raw materials for preparing the stabilizers (reaction products) of this invention can be represented, schematically, by the following formulae (I), (II) and (III), respectively.

$(RO)_2 M \cdot x MCO_3$      (I)

$(RCOO)_2 M \cdot x MCO_3$      (II)

$(RO)(RCOO) M \cdot x MCO_3$      (III)

In each of the above formulae, RO denotes the residue of a monobasic phenol, RCOO denotes the residue of a monobasic carboxylic acid, and M denotes an alkaline earth metal and x denotes a positive number larger than 0.

The monobasic phenol providing the RO residue includes, for example, phenol, p-t-butylphenol, isoamyl phenol, octylphenol, nonylphenol, cresol, xylenol, octadecylphenol, dinonyphenol, diisobutylphenol, etc. The monobasic carboxylic acid providing the RCOO residue includes, for example, caproic acid, caprylic acid, pelargonic acid, 2-ethylhexylic acid, capric acid, neodecanoic acid, undecylenic acid, lauric acid, myristic acid, palmitic acid, stearic acid, isostearic acid, 12-hydroxystearic acid, ricinoleic acid, linolic acid, linolenic acid, oleic acid, behenic acid, erucic acid, beef tallow fatty acid, coconut oil fatty acid, tall oil fatty acid, soybean oil fatty acid, benzoic acid, p-t-butylbenzoic acid, ethylbenzoic acid, toluic acid, naphthenic acids, etc. The sephenols and carboxylic acids may be used in combination of two or more.

Compounds providing the alkaline earth metal M include compounds capable of forming salts by reaction with acids, for example, oxides, hydroxides, carbonates, etc. of barium, calcium, magnesium, strontium, etc.

x means an excess amount of the metal in the complex, and is a positive number larger than 0, as described above, but generally, is preferably 0.1 to 60, particularly 0.5 to 30. A metal ratio is generally used as a measure expressing the degree of overbasicity. The metal ratio is a value characterizing overbased alkaline earth metal phenolate-carbonate complexes, overbased alkaline earth metal carboxylate-carbonate complexes and overbased alkaline earth metal phenolate carboxylate-carbonate complexes, and means the total chemical equivalents of the metal in the complex to the equivalent of the metal required for the monobasic phenol and/or the monobasic carboxylic acid in the complexes to form a neutral salt. In other words, x corresponds to "(metal ratio)—1". Therefore, particularly preferred metal ratios in this invention can be said to be 1.5 to 31.

The overbased alkaline earth metal phenolate-carbonate complexes, overbased alkaline earth metal carboxylate-carbonate complexes and overbased alkaline earth metal phenolate carboxylate-carbonate complexes can be prepared by conventional processes. For example, the desired complex can be obtained by dispersing an alkaline earth metal compound in a solvent, adding a smaller than its chemical equivalent amount of a monobasic phenol and/or a monobasic carboxylic acid in the presence of a reaction assistant such as an alcohol, subjecting the mixture to reaction under heating and stirring, blowing carbon dioxide into the reaction mixture to convert the unreacted alkaline earth metal compound to a carbonate, and, if necessary, filtering out the solid matter for concentration adjustment.

The polybasic carboxylic acid anhydride having not more than 10 carbon atoms used for preparing the stabilizer of this invention by reacting therewith the above-mentioned overbased complex, includes, for example, maleic anhydride, succinic arthydride, oxalic anhydride, phthalic anhydride, itaconic anhydride, citraconic arthydride, trimellitic anhydride or pyromellitic arthydride, etc. These acid arthydrides can, if necessary, be used in combination of two or more. These acid anhydrides are used in an amount necessary to substitute the acid anhydrides for 0.1 to 95%, preferably 1.0 to 80% of the carbonate radical in the above over based complex. This percentage is designated "a carbonate radical substitution rate" in the later described examples.

The halogen-containing resin used in this invention includes, for example, polyvinylhalides such as polyvinyl chlorides, polyvinylidene chlorides, polyvinyl bromides, polyvinyl fluoride, chlorinated polypropylenes and brominated polyethylenes; resins obtained by halogenating polyolefins; copolymers of halogenated resins such as vinyl chloride-urethane copolymers, vinyl chloride-vinyl acetate copolymers, vinyl chloride-styrene copolymers, vinyl chloride-ethylene copolymers, vinyl chloride-propylene copolymers and vinyl chloride-vinylidene chloride-vinyl acetate copolymers; blends of polymers such as ABS, MBS, EVA, polybutadienes, polyurethanes and polyvinyl acetates with halogen-containing resins; etc.

The composition of this invention is prepared by adding 0.01 to 10 weight parts, preferably 0.1 to 5 weight parts of the above reaction product as a stabilizer to 100 weight parts of such a halogen-containing resin.

It is, of course, possible to additionally compound known substances usually used as stabilizer ingredients into the composition of this invention, so long as they does not reduce the effects of this invention. These usually used stabilizer ingredients include organic acid metallic salts, organic phosphite compounds, organotin compounds, metal hydroxides, metal oxides, polyols, nitrogen-containing non-metallic compounds, β-diketone compounds, epoxy compounds, etc. Further, it causes no inconvenience to compound, according to necessity, plasticizers, pigments, fillers, foaming agents, antistatic agents, anti-fogging agents, plate-out preventing agents, surface treating agents, lubricants, flame retardants, antioxidants, ultraviolet absorbers, crosslinking agents, fluorescent agents, brighteners, fungicides, germicides, processing aids, etc.

Synthesis of overbased complexes used for preparation of the stabilizers (reaction products) of this invention is exemplified below by the following synthetic examples 1 to 8.

Synthetic example 1

To a mixture of 40 g of methanol, 30 g of octanol and 280 g of process oil (PUREXX12 : Esso Petroleum) was added 111 g of calcium hydroxide gradually to disperse it, 86 g of oleic acid was added, the mixture was stirred for 30 minutes, and carbon dioxide (20 L/hour) was blown thereinto at 50° C. for 6 hours to progress reaction. The mixture was gradually warmed to 160° C. to continue reaction while the formed water and the alcohol were distilled off, and then filtered to give a brown solution of an overbased calcium oleate-carbonate complex (Ca content=6.9% by weight; metal ratio=5.2) (this product is designated S-1).

Syntheric example 2

To a mixture of 50 g of octanol and 150 g of process oil (PUREXX12 : Esso Petroleum) was added 122 g of barium oxide gradually to disperse it, 24 g of water and 117 g of oleic acid were added, the mixture was stirred for 30 minutes, and carbon dioxide (20 L/hour) was blown thereinto at 130° C. for 3 hours to progress reaction. The mixture was gradually heated to 190° C. to continue reaction while water was distilled off, and then filtered to give a brown solution of an overbased barium oleate-carbonate complex (Ba=21%; metal ratio=3.4) (this product is designated S-2).

Synthetic example 3

To a mixture of 60 g of heptanol and 120 g of process oil (PUREXX7:Esso Petroleum) was added 177 g of barium oxide gradually to disperse it, 33 g of water and 43 g of a soybean fatty acid (containing linolic acid, oleic acid, stearic acid, linolenic acid, palmitic and myristic acid as main components) were added, the mixture was stirred for 30 minutes, and carbon dioxide (20 L/hour) was blown thereinto at 130° C. for 5 hours to progress reaction. The mixture was gradually heated to 170° C. to continue reaction while water and heptanol were distilled off, 130 g of an aromatic hydrocarbon solvent (Solves so 100 Esso Petroleum) was added, and the mixture was filtered to give a brown solution of an overbased barium salt of the soybean fatty acid-carbonate complex (Ba=21%, metal ratio=13.1) (this product is designated S-3).

Synthetic example 4

To a mixture of 45 g of methanol, 40 g of octanol and 280 g of process oil(PUREXX12:Esso Petroleum) was added 60 g of magnesium oxide gradually to disperse it, 12 g of water and 87 g of linolic acid was added, the mixture was stirred for 30 minutes, and carbon dioxide (10 L/hour) was blown thereinto at 50° C. for 6 hours to progress reaction. The mixture was gradually heated to 190° C. to continue reaction while the formed water and the alcohols were distilled off, and then filtered to give a brown overbased magnesium oleate-carbonate complex solution (Mg=3.3%; metal ratio= 4.0) (this product is designated S-4).

Synthetic example 5

To a mixture of 134 g of nonylphenol, 174 g of process oil (Mentor 28:Esso Petroleum) and 62 g of an aromatic hydrocarbon solvent (Solvesso 100: Esso Petroleum) was added 243 g of strontium hydroxide (octahydrate salt) gradually to disperse it, the mixture was subjected to reaction at 105° C. for one hour, and water was completely removed at 130° C. Carbon dioxide (10 L/hour) was blown thereinto for 5 hours to progress reaction, and the mixture was gradually heated to 155° C. to continue reaction while water was distilled off, and then filtered to give a brown solution of an overbased strontium nonylphenolate-carbonate complex (Sr=15%; metal ratio=2.9) (this product is designated S-5).

Synthetic example 6

To a mixture of 104 g of nonylphenol, 124 g of process oil (Mentor 28: Esso Petroleum) and 40 g of an aromatic hydrocarbon solvent (Solvesso 100: Esso Petroleum) was added 138 g of barium hydroxide (monohydrate salt) gradually to disperse it, the mixture was subjected to reaction at 105° C. for one hour, and water was completely removed at 130° C. Carbon dioxide (30 L/hour) was blown thereinto for 2 hours to progress reaction, 41 g of p-t-butyl benzoate was added, the mixture was gradually heated to 155° C. to progress reaction while water was distilled off, 20 g of an aromatic hydrocarbon solvent (Solvesso 100: Esso Petroleum) was added, and the mixture was filtered to give a dark-brown solution of an overbased barium monyl phenolate p-t-butyl benzoate-carbonate complex (Ba=21%; metal ratio=2.0) (this product is designated S-6).

Syntheric example 7

To a mixture of 65 g of nonylphenol, 28 g of phenol, 192 g of process oil (Mentor 28: Esso Petroleum) and 50 g of an aromatic hydrocarbon solvent (Solvesso 100: Esso Petroleum) was added 173 g of barium hydroxide (monohydrate salt) gradually to disperse it, the mixture was subjected to reaction at 105° C. for one hour, and water was completely removed at 130° C. Carbon dioxide (20 L/hour ) was blown thereinto for 4 hours to progress reaction, 22 g of octylic acid was added, the mixture was gradually heated to 155° C. to progress reaction while water was distilled off, 100 g of an aromatic hydrocarbon solvent (Solvesso 100: Esso Petroleum) was added, and the mixture was filtered to give a dark-brown solution of an overbased barium nonylphenolate octylate-carbonate complex (Ba=21%; metal ratio=2.4) (this product is designated S-7).

Synthetic example 8

To a mixture of 39.2 g of methanol, 24 g of octanol and 257.6 g of process oil (PUREXX 12: Esso Petroleum) was added 74.0 g of calcium hydroxide gradually to disperse it. The mixture, after adding 230.4 g of oleic acid thereto, was stirred for 30 minutes. Carbon dioxide (20 L/hour) was blown thereinto at a temperature of 50° C. for 3.5 hours to progress reaction. The mixture was gradually heated to 160° C. to progress reaction while water and alcohols were distilled off. After the reaction was completed, the mixture was filtered to give a brown solution of an overbased calcium oleate-carbonate complex (Ca=7.1%; metal ratio= 2.5) (this product is designated S-8).

It is also possible to prepare stabilizers (reaction products) of this invention using commercially available overbased complexes in place of ones as synthesized in the above synthetic examples. Representative examples of such commercially available overbased complexes are Lubrizol 2117 (overbased calcium oleate/carbonate complex; calcium 14%), Lubrizol 2116 (overbased basic barium oleate/carbonate complex; barium 34%), Lubrizol 2106 (overbased barium nonylphenolate/carbonate complex; barium 28.5%) (they are produced by Lubrizol CO., USA), etc.

In the following Synthetic examples 31 and 32 exemplifying preparation of stabilizers (reaction product) of this invention, Lubrizol 2116 and Lubrizol 2106 are used after diluted with a solvent in order to unify the barium content to 21%, as shown in the following Preparation examples 1 and 2.

Preparation example 1

61 g of an aromatic hydrocarbon solvent (Solvesso 100: Esso Petroleum) was added to 100 g of Lubr izol 2116, followed by stirring at 60° C. to give solution (this preparation is designated T-1).

Preparation example 2

35 g of an aromatic hydrocarbon solvent (Solvesso 100: Esso Petroleum) was added to 100 g of Lubrizol 2106, followed by stirring at 60° C. to give a solution (this preparation is designated T-2).

Examples of preparing stabilizers (reaction products) of this invention from overbased complexes and polybasic carboxylic acid anhydrides are shown below as Synthetic examples 9 to 33, together with Comparative synthetic examples.

Synthetic examples 9 to 33 and Comparative synthetic examples 1 to 3

Synthetic examples 9 to 33 are those wherein stabilizers (reaction products) of this invention were synthesized using the above S-1 to S-8, Lubrizol 2117 and T-1 and T-2, and Comparative synthetic examples 1 and 2 are those wherein monobasic carboxylic acid anhydrides not utilized in this invention were used.

In accordance with the composition shown in Table-1, the overbased alkaline earth metal phenolate-carbonate complex, the overbased alkaline earth metal carboxylate-carbonate complexes or the overbased alkaline earth metal phenolate carboxylate-carbonate complexes was put in a beaker, the acid anhydride was added while the complex was stirred at 30° C., the mixture was gradually heated to carry out reaction while carbon dioxide was removed, and thereby a uniform liquid reaction product was obtained. The carbonate radical substitution rates of reaction products (S-9 to S-36) obtained by this synthesis are shown in Table-1.

The merits of resin compositions of this invention comprising halogen-containing resins having added thereto stabilizers (reaction products) of this invention are demonstrated below by Examples 1 to 85 and Comparative examples 1 to 36.

The contents of the tests in these examples are as follows (1) Heat stability test: A specimen is heated at the prescribed temperature in a gear oven, and the coloring degree is judged by visual observation at the prescribed intervals of time according to the following criterion.

Coloring degree 1 coloress

Coloring degree 2 pale yellow

Coloring degree 3 yellow

Coloring degree 4 yellowish brown

Coloring degree 5 black (2) Transparency test: The transparency of specimen is judged by visual observation according to the following criterion.

Transparency 1 transparency is very good

Transparency 2 transparency is good

Transparency 3 transparency is a little poor

Transparency 4 transparency is poor (3) Plate-out property test: A specimen is put closely on a chrome-plated metal plate, heated 160° C. for 5 minutes, and then quickly peeled by pressing a rubber roller several times against the specimen. A new specimen of the same composition is placed closely again on the spot of peeling, and the same operation is repeated. The procedure is repeated four times, and then the degree of the soil is judged by visual observation according to the following criterion.

Values of the soil degree have the following meanings.

Soil degree 1 soil is not observed

Soil degree 2 slight soil is observed

Soil degree 3 soil is observed

Soil degree 4 a large amount of soil is observed (4) Polyurethane heat resistance test: A semi-rigid polyurethane is cast onto one side of a specimen so as to be 10 mm thickness and foamed, and then heated in an oven of 120° C. and a number of days taken by the time when the change of color of the surface of the specimen becomes 10 or more in terms of color difference ($\Delta E$) by a differential colorimeter compared with the same specimen not heated is measured.

Examples 1 to 14 and Comparative examples 1 to 5

In order to demonstrate the effects of this invention, the following composition obtained using one of the reaction products of Synthetic examples 9 to 33 and Comparative synthetic examples was kneaded at 170° C. for 5 minutes on a roll, and then pressed at 180° C. for 5 minutes to give a sheet 1 mm thick. Specimens were cut out from this sheet and tested for heat stability and transparency. The results are shown in Table- 2.

| [Compounding composition (compounding for non-rigid transparent products)] | |
| --- | --- |
| PVC (polymerization degree: 1050) | 100 weight parts |
| Plasticizer (DOP*[1]) | 40 weight parts |
| Epoxidized soybean oil | 3 weight parts |
| Zinc stearate | 0.3 weight parts |
| Phosphite ester (DPDP*[2]) | 1.0 weight parts |
| Reaction product | See Table 2 |

*[1]Dioctyl phthalate
*[2]Diphenyl decyl phosphite

Examples 15 to 23 and Comparative examples 6 to 12

The following composition was kneaded at 170° C. for 5 minutes on a roll, and then pressed at 190° C. for 5 minutes to give a sheet 1 mm thick. Specimens were cut out from this sheet and tested for heat stability and transparency. The results are shown in Table-3.

| [Compounding composition (compounding for semi-rigid transparent products)] | |
| --- | --- |
| PVC (polymerization degree: 1030) | 100 weight parts |
| Plasticizer (DOP) | 20 weight parts |
| Epoxidized soybean oil | 3 weight parts |
| Zinc stearate | 0.5 weight parts |
| Barium stearate | 0.5 weight parts |
| Phosphite ester (DPDP) | 0.8 weight parts |
| Dibenzoylmethane | 0.1 weight parts |
| Reaction product | See Table 3 |

Examples 24 to 32 and Comparative examples 13 to 17

The following composition was kneaded at 190° C. for 5 minutes on a roll, and then pressed at 190° C. for minutes to give a sheet 1 mm thick. Specimens were cut out from this sheet and tested for heat stability and transparency. The results are shown in Table-4.

| [Compounding composition (compounding for rigid products)] | |
| --- | --- |
| PVC (polymerization degree: 800) | 100 weight parts |
| Metablen P-530A*[1] | 3 weight parts |
| (produced by Mitsubishi Rayon Co., Ltd.) | |

-continued

| [Compounding composition (compounding for rigid products)] | |
| --- | --- |
| Epoxidized linseed oil | 3 weight parts |
| Zinc stearate | 1 weight parts |
| Barium stearate | 0.3 weight parts |
| Antioxidant (Antiox-10*[2]) | 0.1 weight parts |
| (produced by NIPPON OIL AND FATS CO., LTD.) | |
| Reaction product | See Table 4 |

*[1]Process aid for PVC
*[2]Tetrakis[methylene-3-(3',5'-di-tert-butyl-4'-hydroxyphenyl)-propionate]-methane Examples 33 to 47 and Comparative examples 18 to 23

The following composition was kneaded at 170° C. for 5 minutes on a roll, and then pressed at 180° C. for minutes to give a sheet 1 mm thick. Specimens were cut out from this sheet and tested for heat stability and plate-out properties. The results are shown in Table-5.

| [Compounding composition (compounding for wire coating)] | |
| --- | --- |
| PVC (polymerization degree: 1300) | 100 weight parts |
| Plasticizer (TOTM*[1]) | 50 weight parts |
| Clay | 10 weight parts |
| Zinc stearate | 0.2 weight parts |
| Calciumm stearate | 0.2 weight parts |
| Stabilizing assistant (NF-100*[2]) | 0.2 weight parts |
| (produced by Nissan Ferro Organic Chemical CO., LTD.) | |
| Stabilizing assistant (NF-SE*[3]) | 0.2 weight parts |
| (produced by Nissan Ferro Organic Chemical CO., LTD.) | |
| Reaction product | See Table 5 |

*[1]Tri-(2-ethylhexyl) trimellitate
*[2]Hydrotalcite perchlorate (stabilizer for PVC)
*[3]Tris(2-hydroxyethyl) isocyanurate Examples 48 to 54 and Comparative examples 24 to 26

The following composition was treated by a supermixer to give a powder compound. The compound was applied onto a glass plate and cured at 190° C. for 5 minutes to give a sheet 1 mm thick. Specimens were cut out from this sheet and subjected to the heat stability test and the polyurethane heat resistance test. The results are shown in Table-6.

| [Compounding composition (compounding for automobile powder slush)] | |
| --- | --- |
| PVC (polymerization degree: 1050) | 90 weight parts |
| PVC Zeon 121 | 10 weight parts |
| (produced by Nippon Zeon Co., Ltd.) | |
| Plasticizer (DL-911P*[1]) | 50 weight parts |
| Titanium oxide | 2 weight parts |
| Stabilizing assistant (NF-100) | 1 weight parts |
| (produced by Nissan Ferro Organic Chemical CO., LTD.) | |
| Zinc stearate | 0.3 weight parts |
| Ultraviolet absorber (Tinuvin P) | 0.1 weight parts |
| (produced by Ciba-Geigy (Japan) Ltd.) | |
| Light stabilizer (LS-770*[2]) | 0.1 weight parts |
| Reaction product | See Table 6 |

*[1]Phthalates of linear $C_9$-$C_{11}$ alcohols
*[2]Bis(2,2,6,6-tetramethyl-4-piperidinyl)sebacate

Examples 55 to 60 and Comparative examples 27 to 29

The following composition was kneaded at 160° C. for 5 minutes on a roll, and then pressed at 180° C. for minutes to give a sheet 1 mm thick. Specimens were cut out from this sheet and tested for heat stability and transparency. The results are shown in Table- 7.

| [Compounding composition (compounding for agricultural film)] | |
|---|---|
| PVC (polymerization degree: 1300) | 100 weight parts |
| Plasticizer (DOP) | 50 weight parts |
| Plasticizer (TCP*[1]) | 4 weight parts |
| Epoxy resin | 2 weight parts |
| Stabilizer (LTL-267B*[2]) (produced by Nissan Ferro Organic Chemical CO., LTD.) | 1.5 weight parts |
| Stabilizer (BP-131G*[3]) (produced by Nissan Ferro Organic Chemical CO., LTD.) | 0.5 weight parts |
| Reaction product | See Table 7 |

*[1]Tricresyl phosphate
*[2]Ba/Zn stabilizer system for PVC
*[3]Ba/Zn stabilizer system for PVC

Examples 61 to 65 and Comparative examples 30 to 32

The following composition was mixed well by a stirrer to give a paste compound. The paste compound was applied onto Kent paper, and cured at 200° C. for one minute to give a sheet having a vinyl thickness of 0.3 mm. Specimens were cut out from this sheet and tested for heat stability and plate-out properties. The results are shown in Table-8.

| [Compounding composition (compounding for paste foamed wall paper)] | |
|---|---|
| Paste resin PX-NLT (produced by SUMITOMO CHEMICAL COMPANY LIMITED) | 100 weight parts |
| Plasticizer (DOP) | 45 weight parts |
| Chlorinated paraffin (A-40) (produced by TOSOH CORPORATION) | 10 weight parts |
| Mineral spirit | 5 weight parts |
| Calcium carbonate (heavy) | 80 weight parts |
| Antimony oxide | 3 weight parts |
| Titanium oxide | 10 weight parts |
| Azodicarbonamide | 2 weight parts |
| Orthobissulfonyl hydrazide | 1 weight parts |
| Zinc octylate | 1 weight parts |
| Reaction product | See Table 8 |

Examples 66 to 70 and Comparative examples 33 to 35

The following composition was kneaded at 140° C. for 5 minutes on a roll, and then pressed at 200° C. for minutes to give a sheet 1.0 mm thick. Specimens were cut out from this sheet and tested for heat stability and plate-out properties. The results are shown in Table-9.

| [Compounding composition (compounding for the foamed sole of shoes)] | |
|---|---|
| PVC (polymerization degree: 1300) | 80 weight parts |
| Urethanized PVC (K-650F*[1]) | 70 weight parts |
| Polyester plasticizer (W-2300*[2]) | 50 weight parts |
| Azodicarbonamide | 0.5 weight parts |
| Magnesium carbonate | 5 weight parts |
| Titanium oxide | 5 weight parts |
| Stabilizer (LTL-265*[3]) (produced by Nissan Ferro Organic Chemical CO., LTD.) | 1 weight parts |
| Reaction product | See Table 9 |

*[1]Graft copolymer of urethane and PVC
*[2]Poly(adipic acid ester) type plasticizer
*[3]Ba/Zn stabilizer system for PVC

Examples 71 to 85 and Comparative example 36

In order to check the effects of other stabilizing assistant, the following composition was kneaded at 180° C. for 5 minutes on a roll, and then pressed at 180° C. for 5 minutes to give a sheet 1 mm thick. Specimens were cut out from this sheet and tested for heat stability. The results are shown in Table-10.

| [Compounding composition (compounding for semi-rigid products)] | |
|---|---|
| PVC (polymerization degree: 1030) | 100 weight parts |
| Plasticizer (DOP) | 20 weight parts |
| Epoxidized soybean oil | 3 weight parts |
| Zinc stearate | 0.5 weight parts |
| Phosphite ester (DPDP) | 1.0 weight parts |
| Dibenzoylmethane | 0.1 weight parts |
| Reaction product (S-24) | 1.0 weight parts |
| Other stabilizing assistant | see Table 10 |

TABLE 1

| Synthesis example | Overbased carboxylate/ carbonate complex | | Acid anhydride | | Carbonate radical substitution rate | Reaction product |
|---|---|---|---|---|---|---|
| 9 | S-1 | 3014 g | Maleic anhydride | 10 g | 2% | S-9 |
| 10 | S-1 | 3014 g | Maleic anhydride | 25 g | 6% | S-10 |
| 11 | S-1 | 3014 g | Maleic anhydride | 49 g | 12% | S-11 |
| 12 | S-1 | 3014 g | Maleic anhydride | 98 g | 24% | S-12 |
| 13 | S-1 | 3014 g | Maleic anhydride | 176 g | 48% | S-13 |
| 14 | S-1 | 3014 g | Maleic anhydride | 316 g | 85% | S-14 |
| 15 | S-1 | 3014 g | Succinic anhydride | 100 g | 24% | S-15 |
| 16 | S-1 | 3014 g | Oxalic anhydride | 90 g | 24% | S-16 |
| 17 | S-1 | 3014 g | Trimellitic anhydride | 144 g | 12% | S-17 |

TABLE 1-continued

| | Overbased carboxylate/ carbonate complex | | Acid anhydride | | Carbonate radical substitution rate | Reaction product |
|---|---|---|---|---|---|---|
| 18 | S-1 | 3014 g | Maleic anhydride/ oxalic anhydride | 25 g/90 g | 18% | S-18 |
| 19 | S-1 | 3014 g | Itaconic anhydride | 56 g | 12% | S-19 |
| 20 | S-1 | 3014 g | Citraconic anhydride | 56 g | 12% | S-20 |
| 21 | S-1 | 3014 g | Phthalic anhydride | 74 g | 12% | S-21 |
| 22 | S-2 | 2218 g | Maleic anhydride | 49 g | 15% | S-22 |
| 23 | S-2 | 2218 g | Oxalic anhydride | 23 g | 8% | S-23 |
| 24 | S-3 | 8546 g | Maleic anhydride | 147 g | 13% | S-24 |
| 25 | S-4 | 2900 g | Maleic anhydride | 74 g | 25% | S-25 |
| 26 | S-5 | 1650 g | Maleic anhydride | 47 g | 25% | S-26 |
| 27 | S-6 | 1307 g | Maleic anhydride | 25 g | 25% | S-27 |
| 28 | S-7 | 1564 g | Maleic anhydride | 34 g | 25% | S-28 |
| 29 | Lubrizol 2117 | 2021 g | Maleic anhydride | 49 g | 7% | S-29 |
| 30 | Lubrizol 2117 | 2021 g | Maleic anhydride | 98 g | 14% | S-30 |
| 31 | T-1 | 5214 g | Maleic anhydride | 123 g | 19% | S-31 |
| 32 | T-2 | 1029 g | Maleic anhydride | 49 g | 25% | S-32 |
| 33 | S-8 | 1408 g | Maleic anhydride | 49 g | 33% | S-33 |
| Comparative example | | | | | | |
| 1 | S-1 | 3014 g | Acetic anhydride | 102 g | 24% | S-34 |
| 2 | S-1 | 3014 g | Benzoic anhydride | 226 g | 24% | S-35 |
| 3 | S-8 | 1408 g | Polyisobutene-substituted succinic anhydride | 550 g | 33% | S-36 |

TABLE 2

| | Addition amount of reaction product (weight part) | | Heat stability test (190° C.) | | | | | | Transparency test |
|---|---|---|---|---|---|---|---|---|---|
| | | | 10 min. | 20 min. | 30 min. | 40 min. | 60 min. | 80 min. | |
| Example | | | | | | | | | |
| 1 | S-9 | (3.0) | 1 | 2 | 3 | 3 | 4 | 5 | 3 |
| 2 | S-10 | (3.0) | 1 | 2 | 3 | 3 | 4 | 5 | 2 |
| 3 | S-11 | (3.0) | 1 | 1 | 1 | 2 | 3 | 4 | 1 |
| 4 | S-12 | (3.0) | 1 | 1 | 1 | 2 | 3 | 4 | 1 |
| 5 | S-13 | (3.0) | 1 | 1 | 1 | 3 | 4 | 4 | 1 |
| 6 | S-14 | (3.0) | 1 | 2 | 2 | 3 | 4 | 5 | 2 |
| 7 | S-15 | (3.0) | 1 | 1 | 2 | 2 | 3 | 4 | 2 |
| 8 | S-16 | (3.0) | 1 | 1 | 1 | 2 | 3 | 4 | 2 |
| 9 | S-17 | (3.0) | 1 | 1 | 2 | 3 | 4 | 5 | 2 |
| 10 | S-18 | (3.0) | 1 | 1 | 2 | 3 | 4 | 5 | 2 |
| 11 | S-22 | (1.5) | 1 | 2 | 2 | 3 | 4 | 4 | 1 |
| 12 | S-23 | (1.5) | 1 | 1 | 2 | 3 | 3 | 4 | 1 |
| 13 | S-29 | (1.5) | 1 | 1 | 2 | 3 | 4 | 5 | 2 |
| 14 | S-30 | (1.5) | 1 | 1 | 1 | 3 | 4 | 4 | 1 |
| Comparative example | | | | | | | | | |
| 1 | S-1 | (3.0) | 2 | 3 | 3 | 4 | 5 | 5 | 4 |
| 2 | S-2 | (1.5) | 2 | 3 | 3 | 4 | 5 | 5 | 4 |
| 3 | Lubrizol 2117 | (1.5) | 3 | 3 | 3 | 3 | 4 | 5 | 3 |
| 4 | S-34 | (3.0) | 3 | 3 | 3 | 4 | 4 | 5 | 4 |
| 5 | S-35 | (3.0) | 2 | 3 | 3 | 4 | 5 | 5 | 4 |

TABLE 3

| | Addition amount of reaction product (weight part) | | Heat stability test (190° C.) | | | | | | Transparency test |
|---|---|---|---|---|---|---|---|---|---|
| | | | 10 min. | 20 min. | 30 min. | 40 min. | 60 min. | 80 min. | |
| Example | | | | | | | | | |
| 15 | S-13 | (0.5) | 1 | 2 | 3 | 4 | 5 | 5 | 1 |
| 16 | S-13 | (1.0) | 1 | 1 | 2 | 3 | 5 | 5 | 1 |

TABLE 3-continued

| | Addition amount of reaction product (weight part) | | Heat stability test (190° C.) | | | | | | Trans-parency test |
|---|---|---|---|---|---|---|---|---|---|
| | | | 10 min. | 20 min. | 30 min. | 40 min. | 60 min. | 80 min. | |
| 17 | S-13 | (2.0) | 1 | 1 | 2 | 2 | 3 | 4 | 1 |
| 18 | S-13 | (3.0) | 1 | 1 | 1 | 2 | 3 | 4 | 2 |
| 19 | S-13 | (5.0) | 1 | 1 | 2 | 3 | 3 | 3 | 3 |
| 20 | S-30 | (0.5) | 1 | 2 | 3 | 4 | 5 | 5 | 1 |
| 21 | S-30 | (2.0) | 1 | 1 | 1 | 2 | 3 | 4 | 2 |
| 22 | S-30 | (5.0) | 1 | 2 | 2 | 3 | 3 | 3 | 3 |
| 23 | S-33 | (2.0) | 1 | 2 | 3 | 4 | 4 | 5 | 2 |
| Comparative example | | | | | | | | | |
| 6 | S-1 | (0.5) | 2 | 3 | 3 | 4 | 5 | 5 | 2 |
| 7 | S-1 | (2.0) | 2 | 3 | 3 | 4 | 5 | 5 | 3 |
| 8 | S-1 | (5.0) | 3 | 3 | 3 | 4 | 4 | 4 | 5 |
| 9 | Lubrizol 2117 | (0.5) | 3 | 3 | 3 | 4 | 4 | 5 | 2 |
| 10 | Lubrizol 2117 | (5.0) | 3 | 3 | 3 | 4 | 4 | 4 | 5 |
| 11 | S-8 | (2.0) | 3 | 3 | 4 | 4 | 5 | 5 | 4 |
| 12 | S-36 | (2.0) | 3 | 3 | 4 | 5 | 5 | 5 | 5 |

TABLE 4

| | Addition amount of reaction product (weight part) | | Heat stability test (190° C.) | | | | | | Trans-parency test |
|---|---|---|---|---|---|---|---|---|---|
| | | | 10 min. | 20 min. | 30 min. | 40 min. | 60 min. | 80 min. | |
| Example | | | | | | | | | |
| 24 | S-12 | (2.0) | 1 | 2 | 2 | 3 | 4 | 5 | 2 |
| 25 | S-19 | (2.0) | 1 | 2 | 3 | 4 | 5 | 5 | 1 |
| 26 | S-20 | (2.0) | 1 | 2 | 3 | 3 | 4 | 5 | 1 |
| 27 | S-21 | (2.0) | 1 | 1 | 2 | 3 | 5 | 5 | 2 |
| 28 | S-24 | (2.0) | 1 | 2 | 2 | 3 | 4 | 4 | 2 |
| 29 | S-27 | (2.0) | 1 | 2 | 2 | 2 | 3 | 4 | 1 |
| 30 | S-28 | (2.0) | 1 | 2 | 3 | 3 | 3 | 4 | 2 |
| 31 | S-31 | (2.0) | 1 | 1 | 2 | 3 | 3 | 4 | 1 |
| 32 | S-32 | (2.0) | 1 | 2 | 3 | 4 | 4 | 4 | 1 |
| Comparative example | | | | | | | | | |
| 13 | S-1 | (2.0) | 2 | 3 | 3 | 4 | 5 | 5 | 3 |
| 14 | S-3 | (2.0) | 2 | 3 | 4 | 4 | 4 | 5 | 3 |
| 15 | S-34 | (2.0) | 3 | 3 | 3 | 4 | 5 | 5 | 4 |
| 16 | Ca-St | (2.0) | 3 | 3 | 4 | 4 | 5 | 5 | 4 |
| 17 | Calcium maleate | (2.0) | 3 | 4 | 4 | 5 | 5 | 5 | 4 |

TABLE 5

| | Addition amount of reaction product (weight part) | | Heat stability test (200° C.) | | | | | | Plate-out test |
|---|---|---|---|---|---|---|---|---|---|
| | | | 10 min. | 20 min. | 30 min. | 40 min. | 60 min. | 80 min. | |
| Example | | | | | | | | | |
| 33 | S-12 | (5.0) | 1 | 2 | 2 | 3 | 3 | 4 | 2 |
| 34 | S-15 | (5.0) | 1 | 1 | 2 | 2 | 3 | 4 | 1 |
| 35 | S-16 | (5.0) | 1 | 2 | 2 | 2 | 3 | 4 | 2 |
| 36 | S-17 | (5.0) | 1 | 1 | 2 | 2 | 3 | 4 | 1 |
| 37 | S-18 | (5.0) | 1 | 1 | 2 | 2 | 3 | 4 | 1 |
| 38 | S-19 | (5.0) | 1 | 2 | 3 | 3 | 3 | 4 | 2 |
| 39 | S-20 | (5.0) | 1 | 2 | 3 | 3 | 3 | 4 | 2 |
| 40 | S-21 | (5.0) | 1 | 1 | 2 | 3 | 3 | 4 | 2 |

TABLE 5-continued

|  | Addition amount of reaction product (weight part) | | Heat stability test (200° C.) | | | | | | Plate-out test |
|---|---|---|---|---|---|---|---|---|---|
|  | | | 10 min. | 20 min. | 30 min. | 40 min. | 60 min. | 80 min. | |
| 41 | S-22 | (5.0) | 1 | 2 | 3 | 3 | 3 | 4 | 1 |
| 42 | S-24 | (5.0) | 1 | 1 | 2 | 2 | 3 | 3 | 2 |
| 43 | S-27 | (5.0) | 1 | 2 | 3 | 3 | 3 | 4 | 2 |
| 44 | S-28 | (5.0) | 1 | 2 | 2 | 3 | 3 | 4 | 1 |
| 45 | S-31 | (5.0) | 1 | 2 | 3 | 3 | 3 | 3 | 1 |
| 46 | S-32 | (5.0) | 1 | 2 | 3 | 3 | 3 | 4 | 2 |
| 47 | S-33 | (5.0) | 2 | 2 | 3 | 3 | 3 | 4 | 2 |
| Comparative example | | | | | | | | | |
| 18 | S-34 | (5.0) | 3 | 3 | 4 | 4 | 4 | 5 | 3 |
| 19 | S-35 | (5.0) | 3 | 3 | 4 | 4 | 4 | 5 | 3 |
| 20 | Ca-St | (5.0) | 4 | 3 | 3 | 4 | 5 | 5 | 4 |
| 21 | Ba-St | (5.0) | 4 | 3 | 3 | 4 | 4 | 5 | 4 |
| 22 | S-8 | (5.0) | 3 | 3 | 4 | 4 | 5 | 5 | 3 |
| 23 | S-36 | (5.0) | 3 | 4 | 4 | 4 | 5 | 5 | 4 |

TABLE 6

|  | Addition amount of reaction product (weight part) | | Heat stability test (200° C.) | | | | | | Polyurethane heat resistance test |
|---|---|---|---|---|---|---|---|---|---|
|  | | | 3 min. | 6 min. | 9 min. | 12 min. | 15 min. | 18 min. | |
| Example | | | | | | | | | |
| 48 | S-12 | (1.5) | 1 | 1 | 2 | 3 | 4 | 4 | 16 |
| 49 | S-22 | (1.5) | 1 | 1 | 2 | 2 | 3 | 3 | 18 |
| 50 | S-24 | (1.5) | 1 | 1 | 1 | 2 | 3 | 3 | 14 |
| 51 | S-27 | (1.5) | 1 | 2 | 2 | 3 | 4 | 4 | 20 |
| 52 | S-28 | (1.5) | 1 | 1 | 2 | 2 | 3 | 4 | 16 |
| 53 | S-30 | (1.5) | 1 | 1 | 1 | 2 | 3 | 4 | 16 |
| 54 | S-31 | (1.5) | 1 | 1 | 2 | 2 | 3 | 3 | 14 |
| Comparative example | | | | | | | | | |
| 24 | S-1 | (1.5) | 2 | 3 | 3 | 4 | 5 | 5 | 6 |
| 25 | S-2 | (1.5) | 3 | 3 | 4 | 4 | 5 | 5 | 8 |
| 26 | S-34 | (1.5) | 2 | 2 | 3 | 4 | 5 | 5 | 8 |

TABLE 7

|  | Addition amount of reaction product (weight part) | | Heat stability test (190° C.) | | | | | | Transparency test |
|---|---|---|---|---|---|---|---|---|---|
|  | | | 10 min. | 20 min. | 30 min. | 40 min. | 60 min. | 80 min. | |
| Example | | | | | | | | | |
| 55 | S-11 | (0.5) | 1 | 2 | 2 | 2 | 3 | 3 | 1 |
| 56 | S-13 | (0.5) | 1 | 1 | 2 | 2 | 3 | 3 | 1 |
| 57 | S-15 | (0.5) | 1 | 2 | 2 | 2 | 3 | 3 | 1 |
| 58 | S-27 | (0.5) | 1 | 1 | 1 | 2 | 3 | 3 | 1 |
| 59 | S-28 | (0.5) | 1 | 1 | 2 | 2 | 3 | 3 | 1 |
| 60 | S-32 | (0.5) | 1 | 1 | 1 | 2 | 3 | 3 | 1 |
| Comparative example | | | | | | | | | |
| 27 | Blank | (0.5) | 2 | 3 | 3 | 3 | 4 | 5 | 2 |
| 28 | S-1 | (0.5) | 3 | 3 | 4 | 4 | 4 | 4 | 3 |
| 29 | S-35 | (0.5) | 3 | 3 | 3 | 4 | 4 | 5 | 4 |

TABLE 8

| | Addition amount of reaction product (weight part) | | Heat stability test (200° C.) | | | | | | Plate-out test |
|---|---|---|---|---|---|---|---|---|---|
| | | | 1 min. | 2 min. | 3 min. | 4 min. | 5 min. | 6 min. | |
| Example | | | | | | | | | |
| 61 | S-11 | (1.0) | 1 | 1 | 2 | 3 | 4 | 4 | 1 |
| 62 | S-22 | (1.0) | 1 | 1 | 2 | 3 | 3 | 3 | 1 |
| 63 | S-25 | (1.0) | 1 | 2 | 2 | 3 | 3 | 4 | 1 |
| 64 | S-26 | (1.0) | 1 | 1 | 2 | 3 | 3 | 4 | 1 |
| 65 | S-31 | (1.0) | 1 | 1 | 2 | 3 | 3 | 4 | 1 |
| Comparative example | | | | | | | | | |
| 30 | S-1 | (1.0) | 2 | 3 | 3 | 5 | 5 | 5 | 2 |
| 31 | S-2 | (1.0) | 1 | 3 | 4 | 4 | 5 | 5 | 2 |
| 32 | S-35 | (1.0) | 1 | 3 | 3 | 4 | 5 | 5 | 3 |

TABLE 9

| | Addition amount of reaction product (weight part) | | Heat stability test (200° C.) | | | | | | Plate-out test |
|---|---|---|---|---|---|---|---|---|---|
| | | | 10 min. | 20 min. | 30 min. | 40 min. | 60 min. | 80 min. | |
| Example | | | | | | | | | |
| 66 | S-12 | (2.0) | 1 | 2 | 3 | 3 | 4 | 4 | 2 |
| 67 | S-13 | (2.0) | 1 | 1 | 3 | 3 | 4 | 4 | 1 |
| 68 | S-24 | (2.0) | 1 | 1 | 2 | 2 | 3 | 4 | 1 |
| 69 | S-30 | (2.0) | 1 | 1 | 2 | 3 | 3 | 4 | 2 |
| 70 | S-31 | (2.0) | 1 | 1 | 2 | 2 | 3 | 4 | 1 |
| Comparative example | | | | | | | | | |
| 33 | S-1 | (2.0) | 2 | 2 | 3 | 4 | 4 | 5 | 3 |
| 34 | S-34 | (2.0) | 2 | 2 | 4 | 4 | 4 | 5 | 4 |
| 35 | S-35 | (2.0) | 2 | 2 | 4 | 4 | 4 | 5 | 4 |

TABLE 10

| | Other stabilizing assistant (addition amount: weight part) | | Heat stability test (185° C.) | | | | | |
|---|---|---|---|---|---|---|---|---|
| | | | 10 min. | 20 min. | 30 min. | 40 min. | 60 min. | 80 min. |
| Example | | | | | | | | |
| 71 | Blank (no stabilizing assistant) | | 1 | 2 | 2 | 3 | 4 | 5 |
| 72 | Octanoylbenzoylmethane | (0.1) | 1 | 1 | 1 | 2 | 3 | 3 |
| 73 | Octanoylbenzoylmethane zinc | (0.1) | 1 | 1 | 1 | 2 | 3 | 4 |
| 74 | Dehydroacetic acid | (0.1) | 1 | 1 | 2 | 3 | 4 | 4 |
| 75 | Melamine | (0.1) | 1 | 1 | 2 | 3 | 4 | 4 |
| 76 | Dioctyltin β-mercaptopropionate | (0.5) | 1 | 1 | 2 | 2 | 3 | 4 |
| 77 | Dipentaerythritol | (0.5) | 1 | 2 | 2 | 2 | 2 | 2 |
| 78 | Pentaerythritol | (0.5) | 1 | 2 | 2 | 3 | 3 | 3 |
| 79 | Polyethylene glycol (PEG-6000) | (0.2) | 1 | 1 | 2 | 2 | 3 | 4 |
| 80 | Zinc glycinate | (0.5) | 1 | 1 | 2 | 3 | 3 | 3 |
| 81 | Magnesium oxide | (0.5) | 1 | 1 | 1 | 2 | 3 | 3 |
| 82 | Calcium hydroxide | (0.5) | 1 | 1 | 2 | 2 | 3 | 3 |
| 83 | Hydrotalcite | (0.5) | 1 | 1 | 2 | 2 | 2 | 2 |
| 84 | Mizukalac *1 | (0.5) | 1 | 1 | 2 | 2 | 2 | 3 |
| 85 | Calfa-VF-GA-B *2 | (0.5) | 1 | 1 | 2 | 3 | 4 | 4 |
| Comparative example 36 | Neither reaction product nor stabilizing assistant is used | | 2 | 2 | 5 | 5 | 5 | 5 |

*1 Inorganic stabilizer for PVC made by Mizusawa Chemicals
*2 Inorganic stabilizer for PVC made by Calfa Chemicals

What is claimed is:

1. A halogen-containing resin composition comprising 100 weight parts of a halogen-containing resin (1), and 0.01 to 10 weight parts of a reaction product (2) of at least one overbased complex selected from the group consisting of overbased alkaline earth metal phenolate-carbonate complexes, overbased alkaline earth metal carboxylate-carbonate complexes and overbased alkaline earth metal phenolate carboxylate-carbonate complexes with at least one polybasic carboxylic acid anhydride having not more than 10 carbon atoms; wherein the reaction product (2) is one in which 0.1 to 95% of carbonate radicals in the overbased complex are substituted by the polybasic carboxylic acid anhydride.

2. The composition according to claim 1 comprising 100 weight parts of the halogen-containing resin (1), and 0.1 to 5 weight parts of the reaction product (2).

3. The composition according to claim 1 wherein the phenolate component of the overbased complex is nonylphenolate.

4. The composition according to claim 1 wherein the carboxylate component of the overbased complex is an oleate, a soybean oil fatty acid salt or p-t-butyl benzoate.

5. The composition according to claim 1 wherein the alkaline earth metal component of the overbased complex is barium, calcium, magnesium or strontium.

6. The composition according to claim 1 wherein the metal ratio of the overbased complex is 1.5 to 31.

7. The composition according to claim 1 wherein the polybasic carboxylic acid anhydride is maleic anhydride, succinic anhydride, oxalic anhydride, trimellitic anhydride, itaconic anhydride, citraconic anhydride or phthalic anhydride.

* * * * *